United States Patent

[11] 3,603,652

| [72] | Inventor | David H. Youden |
| --- | --- | --- |
| | | Worcester, Mass. |
| [21] | Appl. No. | 804,580 |
| [22] | Filed | Mar. 5, 1969 |
| [45] | Patented | Sept. 7, 1971 |
| [73] | Assignee | The Heald Machine Company |
| | | Worcester, Mass. |

[54] SLIDE BEARINGS FOR MACHINE TOOL WAY
3 Claims, 2 Drawing Figs.

[52] U.S. Cl. ............................................. 308/5,
90/58 R, 184/5, 308/9
[51] Int. Cl. ........................................ F16c 17/04,
F16n 1/00
[50] Field of Search ............................ 308/5, 122,
9; 184/5; 137/525 X, 525; 90/58 R; 251/61

[56] References Cited
UNITED STATES PATENTS

| 2,615,675 | 10/1952 | Mellert | 137/525 X |
| --- | --- | --- | --- |
| 3,160,329 | 12/1964 | Radic et al. | 137/525 X |
| 3,251,633 | 5/1966 | Mohsin | 308/5 |
| 3,260,162 | 7/1966 | Atherton | 308/5 X |
| 3,271,086 | 9/1966 | Deffrenne | 308/9 X |
| 3,401,719 | 9/1968 | Rosser | 137/525 X |
| 3,442,560 | 5/1969 | De Gast | 308/5 |
| 3,466,951 | 9/1969 | Greenberg | 308/5 X |

Primary Examiner—Manuel A. Antonakas
Attorney—Norman S. Blodgett

ABSTRACT: This invention relates to a machine tool way, and more particularly, to apparatus providing the bearing system between relatively sliding parts of a machine tool, wherein the way surfaces are maintained in parallel, spaced relationship by pressure fluid.

PATENTED SEP 7 1971

3,603,652

INVENTOR.
DAVID H. YOUDEN
BY
Thomas S. Blodgett
ATTORNEY

SLIDE BEARINGS FOR MACHINE TOOL WAY

BACKGROUND OF THE INVENTION

In the construction of machine tools, it has become common practice to provide the lubrication between the sliding ways by making use of hydrostatic pressure fluid. However, this fluid can be squeezed from between the surfaces and increased loads on the machine tool parts (either from the variation in weight of successive workpieces or variations in force due to the machining operation) causes the distance between the way surfaces to vary with the force. This causes the parts of the machine tool to move relative to one another and introduces inaccuracies into the machining operation. These and other difficulties experienced with the prior art devices have been obviated in a novel manner by the present invention.

It is, therefore, an outstanding object of the invention to provide a machine tool way having a very stiff spring constant.

Another object of this invention is the provision of a machine tool way in which lubrication is provided by hydrostatic fluid pressure, wherein variations in force between the way surfaces does not result in change in the distance between the surfaces.

A further object of the present invention is the provision of a hydrostatic way having a restrictor in the passage between the source of fluid pressure and the way surfaces through which the fluid flows, means being provided to cause the flow of fluid between the surfaces to remain proportional to load.

It is another object of the instant invention to provide a hydrostatic fluid system including a restrictor having a variable restriction orifice, the value of the resistance presented by the orifice varying to compensate for changes in resistance to flow in the way.

With these and other objects in view, as will be apparent to those skilled in the art, the invention resides in the combination of parts set forth in the specification and covered by the claims appended hereto.

SUMMARY OF THE INVENTION

In general, the invention involves a machine tool way having a first way surface and a second way surface located in spaced, parallel relationship to one another. A pocket is formed in the first way surface and a passage leads from the pocket to a source of pressure fluid. A restrictor is located in the passage and the restrictor has a variable resistance to the flow of fluid from the source to the pocket, the resistance being maintained at all times at such a value that the flow of fluid between the two way surfaces remains proportional to load.

More specifically, the restrictor includes a diaphragm whose central portion lies adjacent a port forming part of the passage for the flow of the pressure fluid. The port consists of an annular flange extending toward the diaphragm and having a bore of circular cross section around which is located a flat surface parallel to and spaced from the diaphragm, the surface having equal width entirely around the bore. The diaphragm is provided with apertures carrying the entire flow of pressure fluid, the apertures being located outside of the area of projection of the port of the diaphragm.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
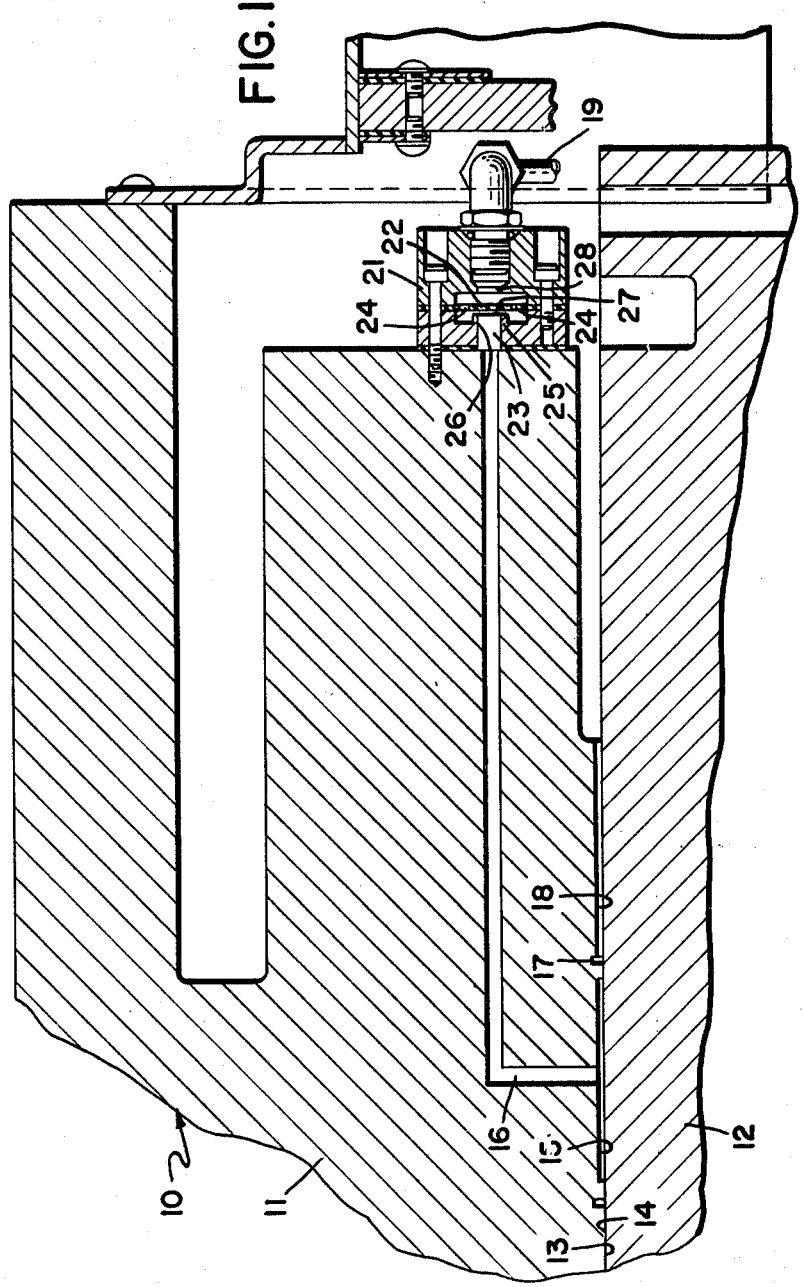
FIG. 1 is a sectional view of a machine tool way embodying the principles of the present invention.

Referring first to FIG. 1, wherein are best shown the general features of the invention, a machine tool, indicated generally by the reference numeral 10, is shown as having two portions 11 and 12 which are intended to slide relative to one another. The portion 11 is provided with a first way surface 13, while the portion 12 is provided with a similar second way surface 14. These way surfaces are located in spaced, parallel relationships to one another, although in the interest of accuracy in the drawing, the spaced between the two surfaces is shown only as a thick line. The shallow pocket 15 is formed in the surface 13 and faces towards the surface 14. It is circular in shape and from its center portion extends a passage 16 leading from the pocket to a source of pressure fluid (not shown). Concentric with the pocket 15 and spaced from it is a deep groove 17 from which a radial groove 18 extends outwardly to the open space outside the way.

Located in the passage 16 between the pocket 15 and the source and a pipe 19 leading to the source of fluid pressure is a restrictor 21. This restrictor has a variable resistance to the flow of fluid from the source of the pocket and the resistance is maintained at all times at such a value that the force between the two surfaces 13 and 14 is equal to the load.

The restrictor includes a flexible diaphragm 22 whose central portion lies adjacent a port 23 forming part of the passage for the flow of pressure fluid. The diaphragm is provided with apertures 24 which carry the entire flow of pressure fluid, the apertures being located outside the area of projection of the port 23 on the diaphragm. The port 23 includes an annular flange 25 extending toward the diaphragm and having a bore 26 of circular cross section around which is located a flat surface 27 which is parallel to and spaced from the diaphragm 22. The surface is of equal width entirely around the bore. The pipe 19 leading to the source of fluid pressure is connected to the restrictor 21 at a port 28, the port being connected with the diaphragm 22 and with the bore 23.

The operation of the apparatus will now be readily understood in view of the above description. In order a maintain the way of operation, it is necessary to provide a source of high pressure fluid at the pipe 19. The fluid gains entrance into the restrictor 21 through the port 28 and makes it pressure felt against the upstream side of the diaphragm 22. The flow passes through the aperture 24 to the downstream side of the diaphragm 22. From the chamber formed around the diaphragm the fluid flows into the passage 16 through the port 23. The fluid flows from the chamber on the downstream side of the diaphragm 22 on the one hand, and the flat surface 27 associated with the flange 25 on the other hand. This passage varies, of course, with the position of the diaphragm 22. From there, the flow of fluid is along the passage 16 into the pocket 15. The fluid flows from the pocket 15 in the annular space between the surface 13 and the surface 14. This surface has a constant width between the circular outer periphery of the pocket 15 and the circular groove 17. In the area between the pocket and the groove is an annular surface which lies in opposition to the board surface 14, and this area is the operative area of the bearing. Fluid flows from this area from the pocket 15 outwardly and, eventually, ends in the groove 17 from which it flows through the groove 18 to the outside of the machine where it is collected in the usual way and returned to the source of pressure fluid.

Figure 2:
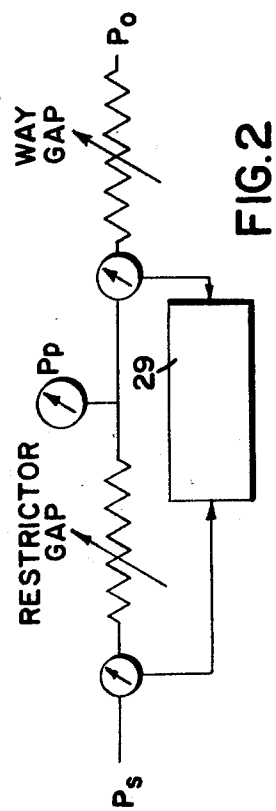
FIG. 2 is a schematic diagram of the pressures and forces to be found in the way system during operation.

Referring particular to FIG. 2, it can be seen that the pressure of the fluid at the source is indicated by the reference letter $P_s$ while, at the exterior of the machine, after the fluid is passed through the system, it is at zero pressure indicated by $P_o$. Between the source pressure $P_s$ and the exterior pressure $P_o$ there are introduced two variable resistances, these being in the form of the restrictor gap (between the port 23 and the diaphragm 22) and the way gap (between the pocket 15 and the groove 17). In the pocket 15, which lies between the two restrictions, the pressure is $P_p$.

As indicated schematically by the control box 29, means is provided to assure that the flow remain proportional to pocket pressure $P_p$. As the weight and force on the upper portion 11 of the machine tool increases, there is a tendency for the fluid gap between the ways to be less. If this gap does become less in thickness, there will be relative movement between the upper portion 11 and the low portion 12 of the machine tool, and this will have its effect on the accuracy of the machine tool to reproduce parts. It is therefore, necessary to increase the flow through the way gap to overcome any tendency of the way gap thickness to diminish (or increase, if the load is reduced). The diaphragm 22 and the port 23 take care of this automatically. If the way gap thickness starts to diminish, due to increased load, the resistance in the way gap will being to increase. This will increase the pocket pressure $P_p$, and this will make itself felt through the passage 16 and at the ports 23. This means that the diaphragm 22 will move away from the port 23, thus decreasing the resistance in the restrictor gap between the port 23 and the downstream surface of the diaphragm 22. As is evident in FIG. 2, this means, therefore, that the force in the gap becomes smaller so that the pressure available at the pocket 15 is increased (because of the reduced restriction in the restrictor gap) and this allows the way gap to move back to its original position, so that the relative position of the upper portion 11 and the lower portion 12 of the machine tool remains the same. Another way of expressing this is that the position of the way gap is determined by the flow, Q, through the bearing surfaces. Now, the flow is determined by the equation $Q=P_s$ (restrictor resistances + gap resistance). In the present invention, any tendency to change the flow Q by an increase in gap resistance is met immediately by a reduction in restrictor resistance and vice versa.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having thus been described, what is claimed as new and desired to secure by Letters Patent is:

1. A machine tool way, comprising:
   a. a first way surface,
   b. a second way surface located in spaced, parallel relation to the first way surface,
   c. a pocket formed in the first way surface,
   d. a passage leading from the pocket to a source of pressure fluid,
   e. a restrictor located in the passage, including a chamber through which pressure fluid flow takes place and a diaphragm dividing the chamber into an entrance cavity and an exit cavity,
   f. one or more apertures in the diaphragm allowing flow between said entrance cavity and said exit cavity,
   g. an entrance port allowing pressure fluid to flow into said entrance cavity, and
   h. an exit annular flange for exit of fluid extending into said exit cavity, and having an open end adjacent the surface of said diaphragm so that said diaphragm can vary the resistance to flow through the restrictor, the diaphragm having a central portion which lies adjacent the open end of the exit annular flange, the apertures in the diaphragm carrying the entire flow of pressure fluid, the apertures being located outside the area of projection of the open end upon the diaphragm.

2. A machine tool way, comprising
   a. a first way surface,
   b. a second way surface located in spaced, parallel relation to the first way surface,
   c. a pocket formed in the first way surface,
   d. a passage leading from the pocket to a source of pressure fluid,
   e. a restrictor located in the passage, including a chamber through which pressure fluid flow takes place and a diaphragm dividing the chamber into an entrance cavity and an exit cavity,
   f. one or more apertures allowing flow between said entrance cavity and said exit cavity,
   g. an entrance port allowing pressure fluid to flow into said entrance cavity, and
   h. an exit annular flange for exit of fluid extending into said exit cavity, and having an open end adjacent the surface of said diaphragm so that said diaphragm can vary the resistance to flow through the restrictor, the open end of the exit annular flange having a bore circular cross section around which is located a flat surface parallel to and spaced from the diaphragm, the surface having equal width entirely around the bore.

3. A machine tool way as recited in claim 2, wherein the flow $Q$, is determined by the formula:
$$Q = h^3 s P_p / 12 \mu t, \text{ where}$$
$h$ is the way gap
$s$ is the perimeter of the pocket
$P_p$ is the pocket pressure
$\mu$ is the viscosity of the fluid, and
$t$ is the width of the way gap.